Figures 1, 2, 3:
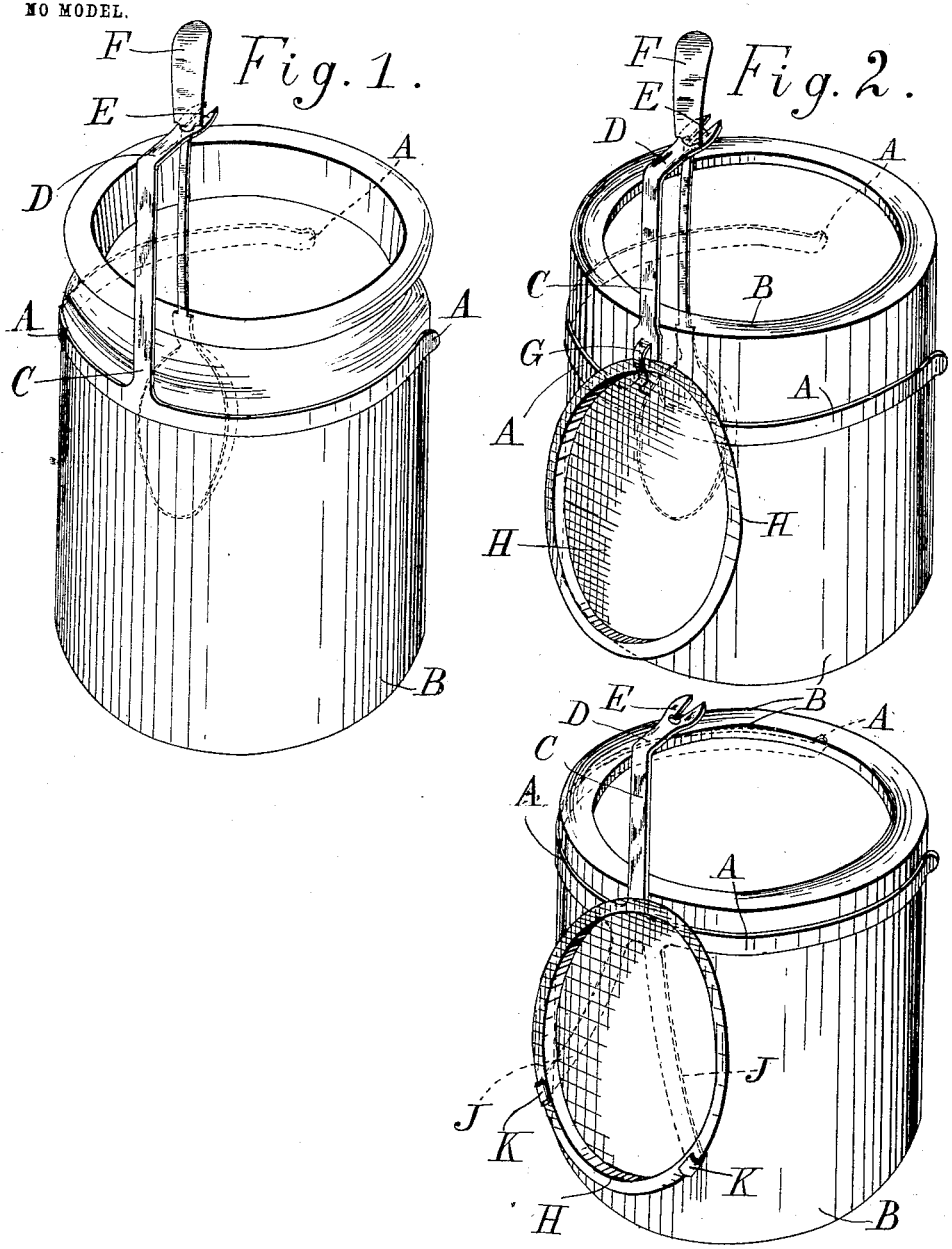

No. 735,088. PATENTED AUG. 4, 1903.
R. E. GOLD.
CAN ATTACHMENT.
APPLICATION FILED MAR. 7, 1902.
NO MODEL.

Witnesses:
Arthur Wilton
F. E. Johnson

Inventor:
R. E. Gold.
By Stanley Popplemeier
Attorneys.

No. 735,088. Patented August 4, 1903.

UNITED STATES PATENT OFFICE.

REGINALD ERNEST GOLD, OF MUMBLES, NEAR SWANSEA, ENGLAND.

CAN ATTACHMENT.

SPECIFICATION forming part of Letters Patent No. 735,088, dated August 4, 1903.

Application filed March 7, 1902. Serial No. 97,211. (No model.)

*To all whom it may concern:*

Be it known that I, REGINALD ERNEST GOLD, a subject of Edward, King of Great Britain and Ireland, residing at Lansdown, Newton, Mumbles, near Swansea, in the county of Glamorgan, Wales, England, have invented a certain new and useful Improved Can Attachment, of which the following is a specification.

My invention consists of an attachment for cans, canisters, jars, bottles, and like vessels, and is designed to support the lid of the vessel and the spoon or other utensil used in removing the contents, such as preserves, of such vessel, so that the portion of the contents which usually clings to such utensil after it has been used will be enabled to fall or drop from it back into the can or vessel. Heretofore it was customary for the spoon or utensil to be returned to the can or like vessel, and it frequently fell out onto the table, or, on the other hand, it sank too deeply into the contents.

Referring to the accompanying drawings, which are to be taken as part of this specification and read therewith, Figure 1 is a perspective view of the attachment shown in use on a preserve-jar and supporting a spoon. Figs. 2 and 3 show in perspective modifications attached to a syrup-tin and carrying both spoon and lid.

Referring to Fig. 1, A is a spring-clip adapted to wholly or partially embrace the body of the jar B. The middle of the clip is provided with an upward stem C, which is bent forwardly over the can, as at D, and forked at its end, as at E. The fork is adapted to receive and hold in suspension the spoon F or other utensil used for removing the contents. The clip is made of a resilient material, so that it will fasten itself tightly on vessels of various diameter and yet be capable of vertical adjustment thereon, so as to raise or lower the spoon.

The modifications shown in Figs. 2 and 3 may be of similar construction and material to that shown in Fig. 1, with the addition of a device for holding the lid of the vessel. In Fig. 2, G is a spring-tongue stamped outwardly from the portion C, so as to admit of the lid H being slipped in behind it and held in that position. In Fig. 3 the lid-holder consists of two depending hangers J J, provided at their lower ends with upturned portions K K, into which the lid is dropped and is held in position.

Although the invention is illustrated as being made of sheet metal, I do not wish to confine it to this or to any other kind of metal. In some cases it may be found cheapest and simplest to manufacture it of wire of suitable gage and temper bent and fashioned to the outline of the several forms herewith illustrated, which will be well understood without full and detailed description.

Having thus described my invention, what I claim is—

A can attachment comprising a spring-clip A, a stem C, an extension D at right angles to said stem, a forked or bifurcated extremity E to said extension, the whole adapted to support a spoon or like utensil above or within the can, and also means combined therewith for holding the lid when removed from the mouth of the can, the whole designed substantially as hereinbefore specified.

In witness whereof I have hereunto set my hand in the presence of two witnesses.

REGINALD ERNEST GOLD.

Witnesses:
ARTHUR STUDLEY TRISTRAM LUCAS,
JOHN WILLIAM PACKE.